United States Patent [19]

Kato

[11] Patent Number: 4,997,168
[45] Date of Patent: Mar. 5, 1991

[54] FLUID-FILLED ELASTIC MOUNT

[75] Inventor: Rentaro Kato, Kasugai, Japan

[73] Assignee: Tokai Rubber Industries, Ltd., Aichi, Japan

[21] Appl. No.: 391,299

[22] Filed: Aug. 9, 1989

[30] Foreign Application Priority Data

Aug. 23, 1988 [JP] Japan .................... 63-110524[U]

[51] Int. Cl.⁵ .................. B60K 5/12; F16F 13/00; F16M 5/00
[52] U.S. Cl. .................. 267/140.1; 248/562; 248/636; 248/573; 267/219
[58] Field of Search ............ 267/140.1, 219, 220, 267/140.3, 140.5, 35, 139, 140, 141.5, 141.6; 248/562, 573, 636, 638, 659; 180/300, 312, 902

[56] References Cited

U.S. PATENT DOCUMENTS

| | | | |
|---|---|---|---|
| 4,407,491 | 10/1983 | Kunihiro et al. | 267/141.4 X |
| 4,595,183 | 6/1986 | Dan et al. | 267/140.1 |
| 4,607,828 | 8/1986 | Bodin et al. | 267/140.1 |
| 4,641,817 | 2/1987 | Clark et al. | 267/140.1 |
| 4,645,188 | 2/1987 | Jordens | 267/140.1 |
| 4,650,168 | 3/1987 | Andrä et al. | 267/140.1 |
| 4,657,232 | 4/1987 | West | |
| 4,700,933 | 10/1987 | Chikamori et al. | 267/140.1 |
| 4,721,288 | 1/1988 | Andrä et al. | |
| 4,741,520 | 5/1988 | Bellamy et al. | 267/140.1 |
| 4,757,982 | 7/1988 | Andrä et al. | 267/140.1 X |
| 4,767,106 | 8/1988 | LeFol | 267/140.1 |
| 4,767,107 | 8/1988 | Le Fol | 267/141.4 X |
| 4,770,396 | 9/1988 | Jouade | 267/140.1 |
| 4,826,126 | 5/1989 | Katayama et al. | 267/140.1 X |
| 4,834,350 | 5/1989 | DeFontenay | 267/140.1 |
| 4,836,513 | 6/1989 | Kramer et al. | 267/140.1 |
| 4,836,515 | 6/1989 | Franz et al. | 267/140.1 X |
| 4,842,258 | 6/1989 | Misaka et al. | 267/140.1 |
| 4,850,578 | 7/1989 | Katayama et al. | 267/140.1 |
| 4,858,879 | 8/1989 | Miyamoto et al. | 267/140.1 |
| 4,880,215 | 11/1989 | Katayama et al. | 267/140.1 |
| 4,889,325 | 12/1989 | Flower et al. | 267/140.1 |

FOREIGN PATENT DOCUMENTS

| | | |
|---|---|---|
| 0183251 | 6/1986 | European Pat. Off. . |
| 0191703 | 8/1986 | European Pat. Off. . |
| 3831816 | 3/1989 | Fed. Rep. of Germany . |
| 55-107142 | 8/1980 | Japan . |
| 57-9340 | 1/1982 | Japan . |
| 58-114933 | 8/1983 | Japan . |
| 58-163842 | 9/1983 | Japan . |
| 61-197836 | 9/1986 | Japan . |
| 0147139 | 7/1987 | Japan .................. 267/140.1 |
| 0046035 | 2/1989 | Japan .................. 267/140.1 |
| 0065345 | 3/1989 | Japan .................. 267/140.1 |

Primary Examiner—Douglas C. Butler
Attorney, Agent, or Firm—Oliff & Berridge

[57] ABSTRACT

A fluid-filled elastic mount for flexible coupling of two members, including first support device and second support device, an elastic body, a closure member for partially defining a fluid chamber, a partition device for dividing the fluid chamber into a pressure-receiving and an equilibrium chamber, a restricted passage for restricted fluid communication between the pressure-receiving and equilibrium chambers, an operating device disposed within the pressure-receiving chamber, and an intermediate cylindrical member for connecting the elastic body and the second support member. The cylindrical member has at least one inward flange extending radially inwardly of the engine mount, which cooperates with a surface of the operating device to constitute a first stopper device for limiting a relative displacement between the first and second support devices in one of opposite load-receiving directions, and at least one outward flange extending radially outwardly of the engine mount, which cooperates with a surface of the first support device to constitute a second stopper device for limiting a relative displacement between the first and second support devices in the other load-receiving direction. Each of the first and second stopper devices includes at least one rubber layer formed as part of the elastic body.

6 Claims, 2 Drawing Sheets

FLUID-FILLED ELASTIC MOUNT

BACKGROUND OF THE INVENTION

1. Field of the Invention

The present invention relates in general to a fluid-filled elastic mount for flexibly connecting two members in a vibration damping or isolating fashion, and more particularly to such a fluid-filled elastic mount which has a simply constructed stopper device for limiting relative displacements between the two members when the mount receives an excessive amount of vibrational load, and which is therefore easy to manufacture.

2. Discussion of the Prior Art

Generally, an elastic mounting structure is disposed between two members of a vibration transmission system, for flexibly connecting the two members or for supporting one of the two members on the other fixed member, so that the elastic mounting structure can effectively damp and isolate input vibrations applied to the two members. As a type of the elastic mounting structure, there has been known a so-called fluid-filled elastic mount as disclosed in European Patent Applications EP-A No. 0 183 251 and 0 191 703. This fluid-filled elastic mount includes: (a) first and second support means which are spaced apart from each other in a load-receiving direction in which a vibrational load is applied to the elastic mount; (b) an elastic body interposed between the first and second support means, for elastic connection of the first and second support means; (c) a flexible closure member secured to the second support means and cooperating with at least the elastic body to define a fluid chamber filled with a non-compressible fluid; (d) partition means for dividing the fluid chamber into a pressure-receiving chamber formed on the side of the first support means, and an equilibrium chamber formed on the side of the second support means; (e) an orifice or restricted passage for restricted fluid communication between the pressure-receiving and equilibrium chambers; and (f) a hat-shaped member which is accomodated within the pressure-receiving chamber and fixedly supported by the first support means, such that the hat-shaped member extends in a direction perpendicular to the load-receiving direction.

In the known fluid-filled elastic mount constructed as described above, vibrations applied to the mount cause the non-compressible fluid to flow between the pressure-receiving and equilibrium chambers through the orifice, and to flow within the pressure-receiving chamber through a restricted portion defined between the hat-shaped member and an inner wall of the chamber. As a result, the input vibrations can be effectively damped or isolated, due to flows of the fluid and resonance of the fluid mass in the orifice and restricted portion, which are respectively tuned to specific frequency ranges.

The known fluid-filled elastic mount is usually provided with a stopper device for preventing an excessive amount of relative displacement between the first and second support means, so as to limit an amount of displacement between the above-indicated two members connected to the first and second support means, whereby an amount of deformation of the elastic body, upon application of an excessively large vibrational load to the mount.

An example of such a stopper device is disclosed in the above-identified EP-A publications. More specifically, the second support means is provided with abutting portions which respectively face opposite surfaces of the hat-shaped member in the load-receiving direction, such that the abutting portions of the second support means are normally spaced by a suitable distance apart from the opposite surfaces of the hat-shaped member. In this arrangement, the stopper device serves to limit the relative displacement between the second support means and the hat-shaped member (first support means) in opposite directions in which the vibrational load is applied, based on abutments of the hat-shaped member against the abutting portions. In this stopper device, a rubber layer having a suitable thickness is provided between each abutting portion of the second support means and the corresponding surface of the hat-shaped member, so as to serve as a buffer for absorbing or attenuating shocks upon abutting contacts of the abutting portions and the hat-shaped member.

In the thus constructed stopper device, however, the provision of the rubber layer between the facing surfaces of the hat-shaped member and second support means requires an independent or separate vulcanization process for applying a rubber material to the appropriate surfaces of the hat-shaped member and/or second support means, in addition to the vulcanization process in which a rubber block as the elastic body of the mount is secured to the first and second support means. The vulcanization process for the stopper device may be accomplished by applying a rubber material over the opposite surfaces of the hat-shaped member. However, it is still required to effect the vulcanization process to form the rubber block so as to connect the first and second support means. This results in increasing the number of process steps and cost of manufacture of the elastic mount, and lowering production efficiency. In this respect, it has been desired to provide a stopper device having a simpler construction than the conventional stopper device.

SUMMARY OF THE INVENTION

The present invention was developed in view of the above problems encountered in the prior art. It is accordingly an object of the invention to provide a fluid-filled elastic mount which is easy to manufacture, and which includes a simply constructed stopper mechanism capable of effectively limiting an amount of relative displacement between the first and second support means, upon application of an excessive amount of vibrational load to the elastic mount.

The above object may be accomplished according to the principle of the present invention, which provides a fluid-filled elastic mount for flexible coupling of two members, including (a) first support means and second support means which are spaced apart from each other in a load-receiving direction in which a vibrational load is applied to the elastic mount, (b) an elastic body interposed between the first and second support means, for elastic connection of the first and second support means, (c) a flexible closure member secured to the second support means and cooperating with at least the elastic body to define a fluid chamber filled with a non-compressible fluid, (d) partition means for dividing the fluid chamber into a pressure-receiving chamber formed on the side of the first support means, and an equilibrium chamber formed on the side of the second support means, (e) means for defining a restricted passage for restricted fluid communication between the pressure-receiving and equilibrium chambers, and (f) an operating device disposed in the pressure-receiving chamber and fixedly supported by the first support means, which includes a flange portion extending radially outwardly of the elastic mount in a direction perpendicular to the load-receiving direction, which fluid-filled elastic mount comprises (g) an intermediate cylindrical member disposed between and connecting the elastic body and the second support means, the intermediate cylindrical member being secured by vulcanization to the elastic body at one of axial ends thereof and fixedly supported by the second support means at the other axial end, the intermediate cylindrical member including at least one inward flange extending radially inwardly of the elastic mount, in facing relationship with a surface of the flange portion of the operating device which faces the first support means, and at least one outward flange extending radially outwardly of the elastic mount, in facing relationship with a surface of the first support means which faces the second support means, (h) first stopper means for limiting a relative displacement between the first and second support means in a direction in which the first and second support means are moved away from each other, comprising facing surfaces of the above-indicated at least one inward flange and the flange portion of the operating device, the first stopper means further comprising a rubber layer which is formed as part of the elastic body and which covers the facing surface of each of the above-indicated at least one inward flange, (i) second stopper means for limiting a relative displacement between the first and second support means in a direction in which the first and second support means are moved toward each other, comprising facing surfaces of the above-indicated at least one outward flange and the first support means, the second stopper means further comprising a rubber layer which is formed as part of the elastic body and which covers at least one of the facing surface of each of the above-indicated at least one outward flange and the facing surface of the first support means.

In the fluid-filled elastic mount constructed as described above, the stopper device having a simple construction is provided to prevent an excessive amount of displacement between the first and second support means in the opposite directions parallel to the load-receiving direction, without increasing the number of components of the mount, that is, without requiring any exclusively designed members functioning as stopper means. According to the present invention, at least one of the facing surfaces of the two members constituting the first or second stopper means is covered by the rubber layer which serves to absorb the shocks upon abutting contacts of the two members. This rubber layer is formed by vulcanization as integral part of the elastic body of the mount. In other words, the elastic body and rubber layer as an integrated structure are formed at once in a vulcanization process. Thus, the formation of the rubber layer which serves as a buffer is easily accomplished, without any additional vulcanization process.

For the reasons as described above, the fluid-filled elastic mount of the present invention can be easily produced at a reduced cost because of its simple construction, while the mount is adapted to sufficiently prevent an excessive amount of displacement between the two members connected by the mount.

In one form of the present invention, the intermediate cylindrical member includes a pair of the inward flanges and a pair of the outward flanges, which pairs are formed at one of the axial ends thereof, such that the pair of inward flanges are opposed to each other in one diametral direction of the intermediate cylindrical member, and such that the pair of outward flanges are opposed to each other in another diametral direction perpendicular to the one diametral direction.

According to one arrangement of the above form of the invention, the first support means includes a generally elongate member having longitudinally opposite end portions which respectively face the pair of the outward flange.

In another form of the present invention, both of the facing surface of each outward flange and the facing surface of the first support means are covered by respective rubber layers.

In a further form of the present invention, the operating device comprises a hat-shaped member including a small-diameter portion, a large-diameter portion, and a shoulder portion having the surface which faces the inward flange or flanges In this case, the large-diameter portion and the shoulder portion constitute the flange portion of the operating device.

Preferably, the operating device further comprises an elastic member supported by the hat-shaped member, and a resonance member elastically supported by the elastic member. In this case, the hat-shaped member has first communication means for fluid communication between the interior thereof and a first division of the pressure-receiving chamber on the side of the first support means, while he elastic member has second communication means for fluid communication between the interior of the hat-shaped member and a second division of the pressure-receiving chamber on the side of the second support means.

BRIEF DESCRIPTION OF THE DRAWINGS

The above and other objects features and advantages of the present invention will become more apparent by reading the following description of its presently preferred embodiment of the invention, when considered in connection with the accompanying drawings, in which.

DETAILED DESCRIPTION OF THE PREFERRED EMBODIMENT

Figure 1:
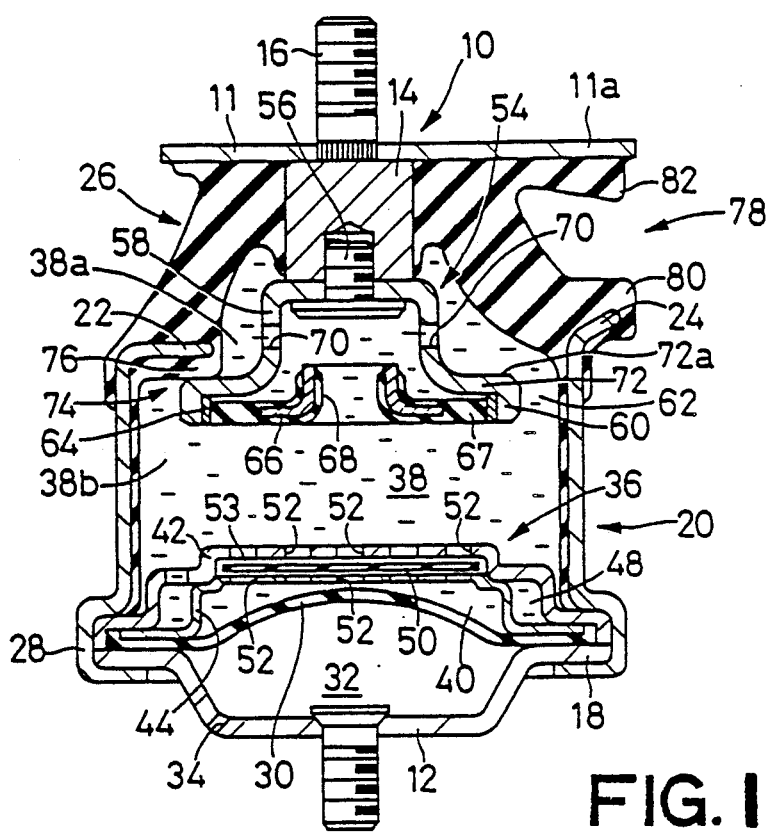
FIG. 1 is an elevational view in cross section taken along line I—I of FIG. 2, illustrating one embodiment of a fluid-filled elastic mount of the invention in the form of an engine mount for a motor vehicle.
Figure 2:
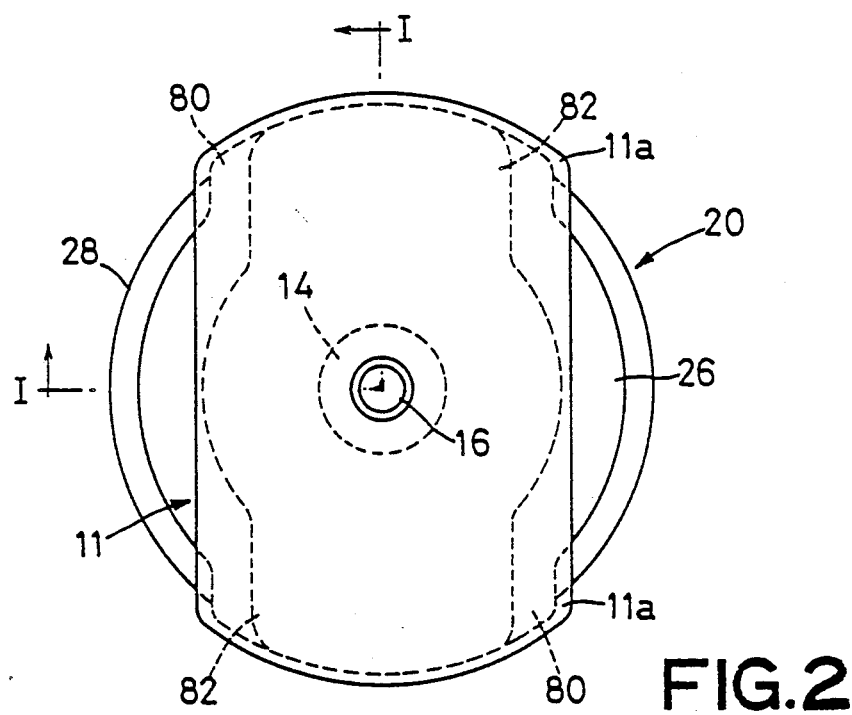
FIG. 2 is a plan view of the engine mount of FIG. 1.

Referring first to FIGS. 1 and 2, there is shown one embodiment of the fluid-filled elastic mount according to the present invention, as applied to an engine mount for a motor vehicle. In FIG. 1, reference numeral 10 designates a first support member including a generally elongate planar portion 11 made of a metal, a support portion 14 and a threaded portion 16. Reference numeral 12 designates a second support member in the form of a dish also made of a metal. The first support member 10 and second support member 12 are spaced apart from each other by a suitable distance, in mutually facing relationship in a load-receiving direction in which a vibrational load is applied to the engine mount.

The generally elongate planar portion 11 has a profile which is elongated in one diametral direction, and thereby assumes a substantially elliptical configuration in a plane perpendicular to the load-receiving direction, as shown in FIG. 2. The elongate planar portion 11 includes longitudinally opposite end portions 11a, and has at its central part the support portion 14 secured to an inner surface thereof, and the threaded portion 16 extending from the outer surface thereof.

On the other hand, the second support member 12 has a flange 18 which extends radially outwardly from an open end thereof. Further, the second support member 12 is formed integrally with an intermediate cylindrical member 20 made of a metal. More specifically, the cylindrical member 20 has a caulking portion 28 at one of its axial open ends remote from the first support member 10, at which the cylindrical member 20 is fluid-tightly caulked against the flange 18 of the second support member 12. In this manner, the two members 12, 20 are assembled into a cup-shaped structure which is open on the side of the first support member 10, such that the first support member 10 and the cup-shaped structure 12, 20 are spaced apart from each other by a suitable distance, in co-axial relationship with each other.

The intermediate cylindrical member 20 has a pair of inward flanges 22 at the other axial open end on the side of the first support member 10, such that the inward flanges 22 extend radially inwardly from the diametrically opposite quarters of the circumference of the axial open end of the cylindrical member 20. These inward flanges 22 are formed by bending inward the appropriate quarter parts of the axial end portion of the cylindrical member 20 by a suitable axial length. The cylindrical member 20 is also provided with a pair of outward flanges 24 adjacent to the inward flanges 22, such that the outward flanges 24 extend radially outwardly and obliquely from the diametrally opposite quarters of the circumference of the axial open end of the cylindrical member 20, which quarters face each other in a direction perpendicular to the direction in which the pair of inward flanges 22 are opposed to each other. These outward flanges 24 are formed by bending outward by a suitable axial length the appropriate quarter parts of the axial end portion of the cylindrical member 20. The first support member 10 and second support member 12 are positioned in facing relationship in the load-receiving direction, such that the diametral direction in which the outward flanges 24 of the cylindrical member 20 are opposed to each other corresponds to the longitudinal direction of the elongate planar portion 11 (i.e., a vertical direction as seen in FIG. 2). In this arrangement, the longitudinally opposite end portions 11a of the elongate planar portion 11 are held in facing relationship with the outward flanges 24 of the cylindrical member 20 in the load-receiving direction of the mount.

The first support member 10 and second support member 12 are elastically connected by an elastic body in the form of a rubber block 26 interposed therebetween. More specifically described, the rubber block 26 is a hollow member having a generally truncated conical shape in cross section. The rubber block 26 is secured by vulcanization at its small-diameter end face to the inner surface of the elongate planar portion 11 of the first support member 10, and at its large-diameter end face to the inner surface of the intermediate cylindrical member 20. Thus, the first support member 10 and the cylindrical member 20 connected by the rubber block 26 are assembled into an integrated structure by means of vulcanization.

In the engine mount of the instant embodiment, the second support member 12 is caulked against the intermediate cylindrical member 20, so that the second support member 12 is connected to the rubber block 26 via the cylindrical member 20. Consequently, the second support member 12 is elastically connected to the first support member 10, by means of the rubber block 26 interposed therebetween.

The thus constructed engine mount further includes a closure member in the form of a flexible rubber diaphragm 30 disposed at the open end of the second support member 12. The diaphragm 30 has an outer peripheral portion which is fluid-tightly gripped by the flange 18 of the second support member 12 and the caulking portion 28 of the cylindrical member 20. Thus, the diaphragm 30 cooperates with the cylindrical member 20 and rubber block 26 to define a fluid chamber maintained in a fluid-tight condition. Between the diaphragm 30 and the second support member 12 is provided an air chamber 32 for permitting the diaphragm 26 to expand toward the second support member 12. The air chamber 32 communicates with the outside of the mount through a hole 34 formed in the second support member 12, so that the pressure within the air chamber 32 is prevented from being varied due to deformation of the diaphragm 30.

The fluid chamber indicated above is filled with a suitable non-compressible fluid such as water, alkylene glycol, polyalkylene glycol or silicone oil. The filling of the fluid chamber with such a non-compressible fluid is accomplished by conducting a caulking operation of the second support member 12 with the cylindrical member 20, in the non-compressible fluid as described above.

The instant engine mount further includes partition means in the form of a generally circular partition device 36 disposed within the fluid chamber, such that the outer peripheral portions of the partition device 36 and the diaphragm 30 are retained by and between the flange 18 of the second support member 12 and the caulking portion 28 of the cylindrical member 28. The fluid chamber is divided by the partition device 36 into a pressure-receiving chamber 38 formed on the side of the rubber block 26, and an equilibrium chamber 40 formed on the side of the diaphragm 30. The pressure of the fluid in the pressure-receiving chamber 38 varies with the application of vibrations to the engine mount, while the pressure change within the equilibrium chamber 40 is avoided by the deformation of the diaphragm 30.

The partition device 36 consists of a first or outer partition member 42 and a second or inner partition member 44, which are superposed on each other in an axial direction of the engine mount In a radially outer portion of the partition device 36, there is provided an annular restricted passage 48 which is defined between the facing surfaces of the first and second partition members 42, 44, for restricted fluid communication between the pressure-receiving and equilibrium chambers 38, 40. In a radially inner portion of the partition device 36, on the other hand, there is formed a generally flat space 53 which accomodates a movable thin plate 50 so that the movable plate 50 is supported displaceably in the load-receiving direction. The generally flat space 53 defined between bottom walls of the first and second partition members 42, 44 communicates with the pressure-receiving chamber 38 and the equilibrium chamber 40, through respective sets of holes 52 formed in the two members 42, 44.

The engine mount constructed as described above is capable of damping or isolating the input vibrations in specific frequency ranges, due to resonance of the fluid mass caused by the fluid flows through the annular restricted passage 48 or through the holes 52 formed in the partition members 42, 44. The specific frequency ranges are suitably determined by adjusting the dimensions or configurations of the annular restricted passage 48 and the holes 52. In the instant embodiment, the engine mount can exhibit excellent damping characteristics for the input vibrations having low frequencies in the neighborhood of 10 Hz, due to resonance of the mass of the fluid flowing through the annular restricted passage 48. In this case, the annular retricted passage 48 is tuned to a predetermined frequency value f1 in the low frequency range. Further, the instant engine mount is capable of lowering its dynamic spring constant based on resonance of the fluid mass in the holes 52, with respect to the input vibrations in a middle frequency range of about 50–100 Hz, which cause no flow of the fluid through the restricted passage 48. In this case, the holes 52 are tuned to a predetermined frequency value f2 in the middle frequency range.

In the pressure-receiving chamber 38 partially defined by the partition device 36, a generally hat-shaped metal member 54 is secured by a mounting bolt 56 to the support portion 14 of the first support member 10, such that the hat-shaped member 54 is open toward the second support member 12. This hat-shaped member 54 has a bottom wall, and a stepped cylindrical portion consisting of a small-diameter portion 58 nearer to the bottom wall, a large-diameter portion 60 nearer to an open end of the member 54, and a connecting portion 72 between the small-diameter and large-diameter portions 58, 60. The connecting portion 72 has a shoulder surface 72a which will be described.

The pressure-receiving chamber 38 is divided by the hat-shaped member 54 into a first division 38a formed on the side of the first support member 10 and a second division 38b formed on the side of the second support member 12. These first and second divisions 38a, 38b of the pressure-receiving chamber 38 communicate with each other, through an annular restricted portion 62 which is defined by and between the outer circumferential surface of the large-diameter portion 60 of the hat-shaped member 54, and the inner circumferential surface of the cylindrical member 20. In this arrangement, the instant engine mount can isolate the input vibrations in a certain frequency range, based on the flow and resonance of the fluid through the annular restricted portion 62, as well known in the art. In the present embodiment, upon application of the vibrations in a high frequency range of about 200–400 Hz, which cause no fluid flows through the holes 52 of the partition members 42, 44, the dynamic spring constant of the engine mount is effectively lowered, due to resonance of the fluid mass in the annular restricted portion 62. The cross sectional area and axial length of the annular restricted portion 62 are tuned to a predetermined frequency value f3 in the high frequency range.

The hat-shaped member 54 is provided with an annular rubber member 67 having a generally L-shaped cross section, such that the rubber member 67 is supported by the large-diameter portion 60 of the hat-shaped member 54. Described more precisely, the annular rubber member 67 is fluid-tightly press-fitted in the opening end of the hat-shaped member 54, via a retainer ring 64 secured to the outer circumferential surface of the rubber member 67. The radially inner portion of the rubber member 67 is formed with a metal ring 66 having a L-shaped cross section. The metal ring 66 thus embedded in and elastically supported by the rubber member 67 serves as a resonance member having a suitable mass. The interior of the hat-shaped member 54 whose opening end is substantially closed by the annular rubber member 67 communicates with the first division 38a of the pressure-receiving chamber 38, through a plurality of holes 70 formed through the small-diameter portion 58 of the hat-shaped member 54, and with the second division 38b of the chamber 38 through a round hole 68 of the annular rubber member 67.

Namely, the instant engine mount has two independent fluid passages between the two divisions 38a, 38b of the pressure-receiving chamber 38, one of which consists of the annular restricted portion 62 described above, and the other of which consists of the round hole 68, the interior of the hat-shaped member 54 and the holes 70. The other fluid passage which passes the interior of the hat-shaped member 54 is tuned to a certain frequency value f4, which is different from the frequency value f3 to which the annular restricted portion 62 is tuned, so that the engine mount can isolate the input vibrations in different frequency ranges, based on the fluid flows and resonance of the fluid through the annular restricted portion 62, and based on those of the fluid through the other fluid passage formed within the hat-shaped member 54. In the present embodiment, the round hole 68 and holes 70 are dimensioned such that the fluid passage including these holes 68, 70 is effective to lower the dynamic spring constant of the engine mount, due to resonance of the fluid in the passage, when the engine mount is subjected to the vibrations in the high-frequency range of about 200–400 Hz, more particularly, the vibrations having frequencies around the above-indicated value f4, which is different from the frequency value f3 to which the annular restricted portion 62 is tuned.

There will be provided a brief description of the vibration isolating capability of the engine mount, which is based on the fluid flow through the fluid passage formed within the hat-shaped member 54.

Each of the holes 70 formed through the small-diameter portion 58 of the hat-shaped member 54 has a relatively large cross sectional area, so as to prevent the holes 70 from being clogged when the engine mount receives the input vibrations to be damped or isolated. Thus, the holes 70 of the hat-shaped member 54 permit free fluid flows between the interior of the hat-shaped member 54 and the first division 38a of the pressure-receiving chamber 38, even when the engine mount receives relatively high-frequency vibrations. In this condition, when the annular rubber member 67 is deformed or expanded toward the outside and inside of the hat-shaped member 54 within the pressure-receiving chamber 38, upon application of the vibrations to the engine mount, the fluid is caused to flow through the holes 70 according to the amount of deformation of the annular rubber member 67.

The annular rubber member 67 as a spring component cooperates with the metal ring 66 as a mass component to constitute a vibrational system or spring-mass system having a predetermined resonance frequency. The resonance effect provided by this vibrational system assures a sufficient amount of fluid flows through the interior of the hat-shaped member 54, which are caused by the elastic deformation of the annular rubber member 67. Consequently, the annular rubber member 67 and the metal ring 66 are effective to prevent the pressure rise in the front portion of the rubber member 67, i.e., the second division 38b of the pressure-receiving chamber 38.

Since the annular rubber member 67 has the round hole 68 formed therethrough, a further sufficient amount of fluid flows through the hat-shaped member 54 are ensured by the elastic deformation of the rubber member 67, due to resonance of the fluid flowing through the round hole 68. Upon application of the vibrations having high frequencies around the value f4 indicated above, the pressure within the pressure-receiving chamber 38 is maintained sufficiently low, to thereby reduce the spring characteristics of the engine mount.

It will be understood from the above-desription that the dynamic spring constant of the engine mount is effectively lowered due to the fluid flows through the hat-shaped member 54, as a result of a synergistic effect given by resonance of the vibrational system constituted by the rubber member 67 and metal ring 66, and resonance of the fluid mass in the round hole 68 of the rubber member 67. Therefore, the cross sectional area and axial length of the round hole 68, and the mass and spring components of the vibrational system in the form of the metal ring 66 and annular rubber member 67 are tuned to the above-indicated frequency value f4 within the high frequency range in which the dynamic spring constant of the mount should be lowered.

As described above, the connecting portion 72 of the hat-shaped member 54 has the shoulder surface 72a. In the instant embodiment, the shoulder surface 72a is positioned in facing relationship in the load-receiving direction with the inner surfaces of the inward flanges 22 formed at the open end portion of the intermediate cylindrical member 20, when the hat-shaped member 54 is installed on the engine mount. As shown in FIG. 1 the shoulder surface 72a of the hat-shaped member 54 is held in contact with rubber layers 76 (which will be described in detail) formed on the inner surfaces of the inward flanges 22 of the cylindrical member 20, before the engine mount is installed on the vehicle body.

When the engine or power unit of the vehicle is installed on the vehicle body via the engine mount, and the load of the engine unit is applied between the first support member 10 and second support member 12, the shoulder surface 72a of the hat-shaped member 54 is moved by a suitable distance away from the inner surfaces of the inward flanges 22 in the load-receiving direction. This arrangement is operable to limit relative displacements between the first and second support members 10, 12 in a direction in which these members 10, 12 are moved away from each other, based on abutting contacts between the shoulder surface 72a of the hat-shaped member 54 and the inner surfaces of the inward flanges 22 of the cylindrical member 20.

It will be understood from the above-description that the inward flanges 22 of the intermediate cylindrical member 20 cooperate with the hat-shaped member 54 to constitute a rebound stopper 74 serving as first stopper means for limiting relative displacements between the first and second support members 10, 12 in the direction described above.

As described above, the rubber layers 76 having a suitable thickness are secured by vulcanization to respective inner surfaces of the inward flanges 22 of the intermediate cylindrical member 20, so that the rubber layers 76 are formed as part of the rubber block 26 of the engine mount. These rubber layers 76 are adapted to absorb or attenuate shocks which may occur upon abutting contacts between the inward flanges 22 and the hat-shaped member 54, when the rebound stopper 74 operates to limit the relative displacements between the first and second support members 10, 12.

Figure 3:
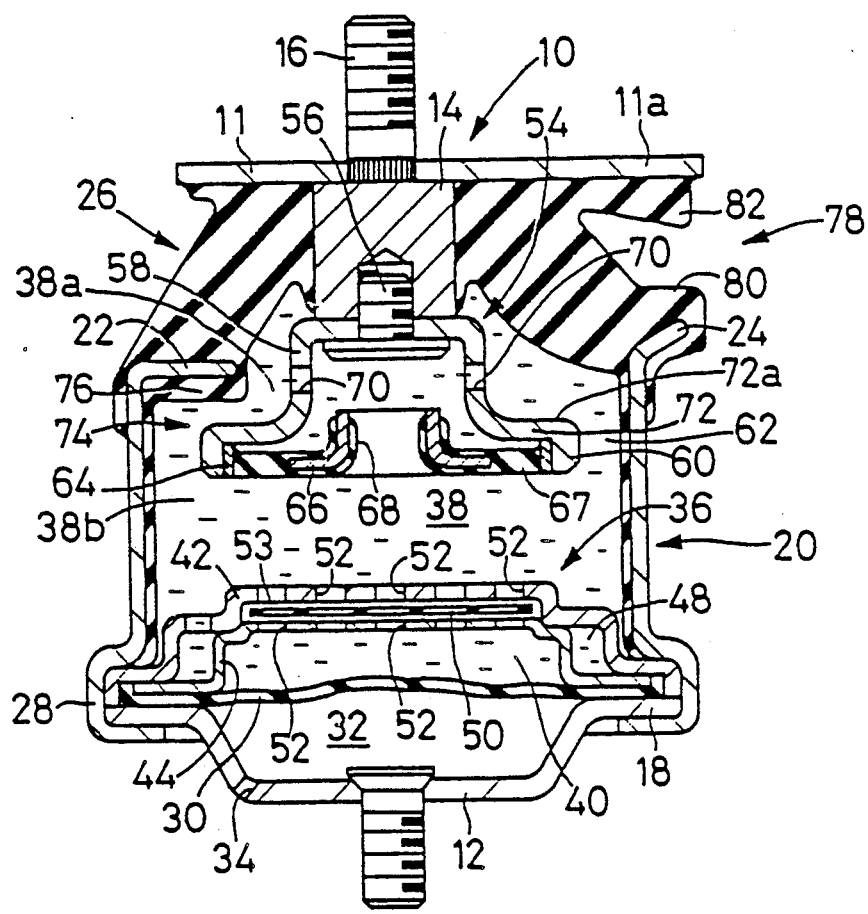
FIG. 3 is an elevational cross sectional view corresponding to that of FIG. 1, illustrating a condition in which the engine mount is installed in place on the motor vehicle.

The intermediate cylindrical member 20 further includes the opposite outward flanges 24 as described above, such that the outward flanges 24 are spaced by a suitable distance apart from the longitudinally opposite end portions 11a of the elongate planar portion 11, in mutually facing relationship in the load-receiving direction, when the engine mount is installed on the vehicle as shown in FIG. 3. This arrangement is operable to limit the relative displacements between the first and second support members 10, 12 in a direction in which the two members 10, 12 are moved toward each other, based on abutting contacts between the outward flanges 24 and the end portions 11a of the elongate planar portion 11 of the first support member 10, via respective rubber layers 80, 82 formed thereon (which will be described).

It will be understood from the above description that the outward flanges 24 of the intermediate cylindrical member 20 cooperates with the elongate planar portion 11 of the first support member 10 to constitute a bound stopper 78 serving as second stopper means for limiting relative displacements between the first and second support members 10, 12 in the direction described above.

The bound stopper 78 further includes the rubber layers 80, 82 integrally formed on the outer surfaces of the outward flanges 24 of the intermediate cylindrical member 20 and the inner surfaces of the longitudinally opposite end portions 11a of the elongate planar portion 11, respectively. More specifically, the rubber layers 80, 82 having suitable thicknesses are secured by vulcanization to mutually facing surfaces of the outward flanges 24 and elongate planar portion 11, so that these rubber layers 80, 82 are formed as part of the rubber block 26 of the engine mount.

The thus formed rubber layers 80, 82 are adapted to absorb or attenuate shocks which may occur upon abutting contacts of the end portions 11a of the elongate planar portion 11 with respect to the outward flanges 24, when the bound stopper 78 operate to limit relative displacements between the first and second support members 10, 12.

In the engine mount of the invention constructed as described above, the amount of relative displacements between the first and second support members 10, 12 is suitably limited by the bound and rebound stoppers 78, 74, when an excessive amout of vibrational load is applied between the first and second support members 10, 12. Further, the rubber layers 80, 82 and 76 functioning as shock absorbers for the bound and rebound stoppers 78, 74 are formed simultaneously and integrally with the rubber block 26 secured to the first and second support members 10, 12, by means of vulcanization. Thus, the formation of these rubber layers 80, 82 and 76 does not require an exclusive vulcanization process, to thereby permit easy and economical manufacture of the engine mount.

The instant engine mount is also advantageous in that the first and second stopper means as described above are provided without increasing the number of components of the engine mount, and therefore without suffering from poor manufactural efficiency caused by the increased number of components of the mount.

The engine mount of the instant embodiment utilizes the fluid flows through the restricted passage 48 for damping the received low-frequency vibrations, and a pressure-absorbing device including the movable plate 50 for lowering its dynamic spring constant when the mount receives middle-frequency vibrations. Further, the instant engine mount utilizes the fluid flows through the annular restricted portion 62 for lowering its dynamic spring constant when the mount receives vibrations in a certain high-frequency range. In addition, the fluid flows through the hat-shaped member 54 are utilized for lowering the dynamic spring constant of the engine mount, when the mount receives vibrations in a high-frequency range different from the certain high-frequency range indicated above. Thus, the instant engine mount can stably exhibit excellent damping and isolating capability for input vibrations in an extremely wide frequency range.

While the presently preferred embodiment has been described, for illustrative purpose only, it is to be understood that the invention is not limited to the precise details of the illustrated embodiment.

In the illustrated embodiment, the pair of inward flanges 22 as part of the rebound stopper 74 and the pair of outward flanges 24 as part of the bound stopper 78 are respectively disposed in diametrically opposite positions of the open end of the intermediate cylindrical member 20. However, the positions of the inward and outward flanges 22, 24 are not confined to those in the illustrated embodiment.

For example, the inward flange is formed over the entire circumference of one of the axial ends of the intermediate cylindrical member, while the outward flange is formed over the entire circumference of the other axial end of the cylindrical member. An example of such an elastic mount is disclosed in EP-A No. 0 191 703. More specifically described, the intermediate cylindrical member may be interposed between the first and second support members 10, 12 such that the axially outer surface of the inward flange faces the shoulder surface 72a of the hat-shaped member 54, and such that the axially outer surface of the outward flange faces the inner surface of the elongate planar portion 11 of the first support member 10. In this case, it is possible that the second support member 12 is caulked against the outer circumference of the outward flange, and thereby secured to the intermediate cylindrical member. Thus, the engine mount may be provided with two stopper devices for limiting relative displacements of the two members of the mount in opposite load receiving directions, such that each of the stopper devices includes abutting surfaces which are formed over the entire circumference of the engine mount.

While the facing surfaces of the bound stopper 78, i.e., the outer surface of each outward flange 24 and inner surface of the elongate planar portion 11 are provided with respective rubber layers 80, 82 in the illustrated embodiment, it is possible to provide only one of the facing surfaces of the stopper 78 with a rubber layer similar to the rubber layers 80, 82.

It is to be noted that the pressure absorbing device including the movable plate 50 or fluid passage formed through the hat-shaped member 54 are not essential to the principle of the present invention, but suitably adopted depending upon required vibration isolating characteristics of a certain type of mounting structure.

While the present invention is applied to an engine mount for a motor vehicle in the illustrated embodiment, the invention is also applicable to mounting structures other than the engine mount, such as a mounting structure to mount various mechanical apparatus.

It will be understood that the invention may be embodied with various other changes, modifications and improvements which may occur to those skilled in the art, without departing from the spirit and scope of the invention defined in the following claims.

What is claimed is:

1. A fluid-filled elastic mount for flexible coupling of two members, including (a) first support means and second support means which are spaced apart from each other in a load-receiving direction in which a vibrational load is applied to the elastic mount, (b) an elastic body interposed between said first and second support means, for elastic connection of said first and second support means, (c) a flexible closure member secured to said second support means and cooperating with at least said elastic body to define a fluid chamber filled with a non-compressible fluid, (d) partition means for dividing said fluid chamber into a pressure-receiving chamber formed on the side of said first support means, and an equilibrium chamber formed on the side of said second support means, (e) means for defining a restricted passage for restricted fluid communication between said pressure-receiving and equilibrium chambers, and (f) an operating device disposed in said pressure-receiving chamber and fixedly supported by said first support means, wherein said operating device includes a flange portion extending radially outwardly of the elastic mount in a direction perpendicular to said load-receiving direction, said fluid-filled elastic mount comprising:

an intermediate cylindrical member disposed between and connecting said elastic body and said second support means, said intermediate cylindrical member being secured by vulcanization to said elastic body at one of axial ends thereof and fixedly supported by said second support means at the other axial end, said intermediate cylindrical member including at least one inward flange extending radially inwardly of the elastic mount, in facing relationship with a surface of said flange portion of the operating device which faces said first support means, and at least one outward flange extending radially outwardly of the elastic mount, in facing relationship with a surface of said first support means which faces said second support means;

first stopper means for limiting a relative displacement between said first and second support means in a direction in which said first and second support means are moved away from each other, comprising facing surfaces of said at least one inward flange and said flange portion of the operating device, said first stopper means further comprising a rubber layer which is formed as part of said elastic body and which covers the facing surface of each said at least one inward flange;

second stopper means for limiting a relative displacement between said first and second support means in a direction in which said first and second support means are moved toward each other, comprising facing surfaces of said at least one outward flange and said first support means, said second stopper means further comprising a rubber layer which is formed as part of said elastic body and which covers at least one of the facing surface of each said at least one outward flange and the facing surface of said first support means.

2. A fluid-filled elastic mount according to claim 1, wherein said intermediate cylindrical member includes a pair of said inward flanges and a pair of said outward flanges, which pairs are formed at one of the axial ends thereof, such that said pair of inward flanges are opposed to each other in one diametral direction of said intermediate cylindrical member, and such that said pair of outward flanges are opposed to each other in another diametral direction perpendicular to said one diametral direction.

3. A fluid-filled elastic mount according to claim 2, wherein said first support means includes a generally elongate member having longitudinally opposite end portions which respectively face said pair of outward flanges.

4. A fluid-filled elastic mount according to claim 1, wherein both of the facing surface of each said at least one outward flange and the facing surface of said first support means are covered by respective rubber layers.

5. A fluid-filled elastic mount according to claim 1, wherein said operating device comprises a hat-shaped member including a small-diameter portion, a large-diameter portion, and a connecting portion having said surface which faces said at least one inward flange, said large-diameter portion and said shoulder portion constituting said flange portion.

6. A fluid-filled elastic mount according to claim 5, wherein said operating device further comprises an elastic member supported by said hat-shaped member, and a resonance member elastically supported by said elastic member, said hat-shaped member having first communication means for fluid communication between the interior thereof and a first division of said pressure-receiving chamber on the side of said first support means, said elastic member having second communication means for fluid communication between the interior of the hat-shaped member and a second division of said pressure-receiving chamber on the side of said second support means.

* * * * *